L. A. & R. J. NAUSS.
POWDER SPRAYER.
APPLICATION FILED OCT. 5, 1912.
1,073,159.
Patented Sept. 16, 1913.
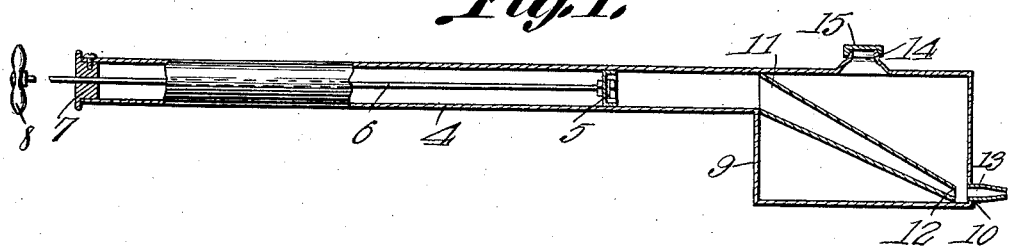
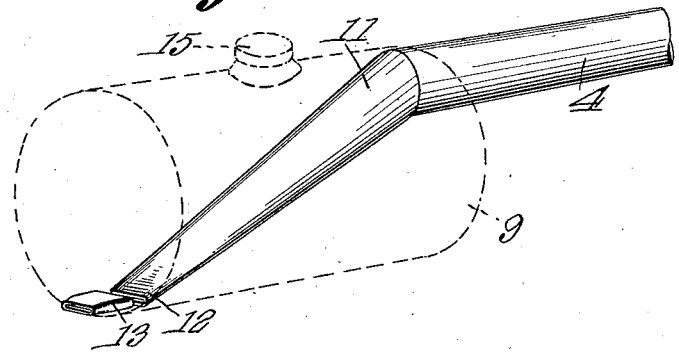
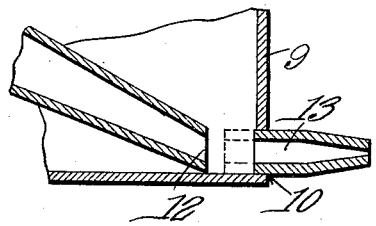
Witnesses
Lee Aaron Nauss and
Ray John Nauss, Inventors
by C. A. Snow & Co.
Attorneys

UNITED STATES PATENT OFFICE.

LEE AARON NAUSS AND RAY JOHN NAUSS, OF GREENVILLE, OHIO.

POWDER-SPRAYER.

1,073,159.  Specification of Letters Patent.  Patented Sept. 16, 1913.

Application filed October 5, 1912. Serial No. 724,204.

*To all whom it may concern:*

Be it known that we, LEE AARON NAUSS and RAY JOHN NAUSS, citizens of the United States, residing at Greenville, in the county of Darke, State of Ohio, have invented a new and useful Powder-Sprayer, of which the following is a specification.

The present invention appertains to powder sprayers, and aims primarily to provide a simple, durable, compact and inexpensive contrivance for spraying dry powders of divers varieties, especially insect powders, and which shall be convenient, serviceable and efficient in its use.

It is also the object of the present invention to provide a powder sprayer which shall have means for regulating the amount of powder discharged or sprayed therefrom at each operation.

To the above and other ends, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The preferred embodiment has been illustrated in the accompanying drawing, wherein:—

Figure 1 is a longitudinal central section of the sprayer, part of the cylinder being shown in full. Fig. 2 is a phantom fragmental perspective of the device. Fig. 3 is a sectional detail on an enlarged scale.

Referring specifically to the drawing, the sprayer embodies an air or force pump comprising the elongated cylinder or tube 4 having a suitable piston 5 working therein, the piston rod 6 passing slidably through the head 7 secured to the outer end of the cylinder and having a suitable handle 8 attached to its outer or free end. The details of this force pump are of no moment and may be varied at will according to the whim of the user.

A cylindrical powder receptacle or container 9 is attached to the inner end of the cylinder 4, the said receptacle being of a greater diameter than the cylinder and being attached at one end to the end of the cylinder so that the cylinder and the receptacle are internally tangential. This receptacle is provided with an outlet opening 10 in its other end, or at the corner diametrically opposite the corner to which the cylinder is attached, the opening 10 being elongated on a chordal line.

The cylinder 4 is provided with an extension 11 passing diagonally through the receptacle 9 and terminating at its free end adjacent the opening 10, the extension projecting toward the said opening and the free end thereof being flattened so as to provide an elongated opening 12 for the extension complementing the elongated outlet opening 10.

A flattened nozzle 13 passes slidably through the elongated opening 10, the outer end of the nozzle being tapered and the inner end of the nozzle being slidable to and from the free end of the extension 11 so as to adjust the space between the extension and the nozzle.

Although the free end of the extension and the nozzle have been illustrated as being flattened, which is highly preferable, it is understood, that the contours of the said parts may be formed in any desirable manner.

The powder receptacle 9 is also provided at one side with an opening or nipple 14 closed by the removable cap 15, in order that the cap may be removed for filling the receptacle with the powder to be sprayed.

In use, it being understood that the piston is arranged at the inner end of the pump, the outward movement of the piston will cause air to be drawn inwardly through the nozzle 13, across the gap or space between the nozzle and the extension and then up the extension into the cylinder. In the meantime, the powder within the receptacle will gravitate into the space or gap between the nozzle and extension and will be drawn into the extension 11 with the air. Then, by forcing the piston inwardly, the air ahead of the piston will be forced outwardly through the extension and across the gap to the nozzle 13. The air, which is laden with the powder or dust is thus discharged from the nozzle, and the outward action of the air will also carry with it additional powder which trickles or gravitates over the free end of the extension 11. Each operation of the piston will therefore eject a certain quantity of powder in order to effectively spray same, the flattened nozzle 13 causing the emission of the air and powder in a sheet or film like manner, whereas a nozzle of different contour would effect a different discharge of the air and powder. It will be noted, that by adjusting the nozzle 13 to and from the free end of the extension 11, the quantity of powder discharged at each operation of the device may be regulated according to the circumstances, the gap between the nozzle and extension controlling the amount of powder which trickles or gravitates into the said gap.

The present device provides a desirable and hand operative contrivance for spraying insect powders or the like for various purposes, the advantages and capabilities of the present device being evident from the foregoing, taken in connection with the drawings, and it will be noted that the objects aimed at have been carried out satisfactorily.

Having thus described the invention, what is claimed is:—

1. A powder sprayer embodying an air cylinder, a powder receptacle attached thereto and having an outlet, a nozzle slidable through the outlet, a piston in the cylinder, and an extension for the cylinder passing through the receptacle so as to project toward and terminate adjacent the inner end of the nozzle.

2. A powder sprayer embodying an air cylinder, a cylindrical powder receptacle of larger diameter attached to one corner thereof, and having an outlet in the diagonally opposite corner, a piston in the cylinder, and an extension for the cylinder passing diagonally through the receptacle and terminating adjacent the outlet, and a nozzle adjustable through the outlet to and from the free end of the extension.

In testimony that we claim the foregoing as our own, we have hereto affixed our signatures in the presence of two witnesses.

LEE AARON NAUSS.
RAY JOHN NAUSS.

Witnesses:
ED. SHAFER,
JEANETTE LONGENECKER.

---

Copies of this patent may be obtained for five cents each, by addressing the "Commissioner of Patents, Washington, D. C."